(12) United States Patent  (10) Patent No.: US 7,775,495 B2
Trachet et al.  (45) Date of Patent: Aug. 17, 2010

(54) ADAPTER ASSEMBLY INCLUDING TELESCOPING LINKS

(75) Inventors: David Trachet, Onstead, MI (US); Richard Hamann, Saline, MI (US)

(73) Assignee: Syron Engineering & Manufacturing, LLC, Saline, MI (US)

( * ) Notice: Subject to any disclaimer, the term of this patent is extended or adjusted under 35 U.S.C. 154(b) by 0 days.

(21) Appl. No.: 11/385,371

(22) Filed: Mar. 21, 2006

(65) Prior Publication Data

US 2006/0228205 A1 Oct. 12, 2006

Related U.S. Application Data

(60) Provisional application No. 60/664,344, filed on Mar. 23, 2005.

(51) Int. Cl.
*A47F 5/00* (2006.01)
(52) U.S. Cl. .............................. 248/288.31; 248/181.1; 248/316.6
(58) Field of Classification Search .................. 248/214, 248/218.4, 181.1, 288.31
See application file for complete search history.

(56) References Cited

U.S. PATENT DOCUMENTS

| | | | | | |
|---|---|---|---|---|---|
| 1,735,212 | A | * | 11/1929 | Pawsat | 248/229.24 |
| 3,815,892 | A | * | 6/1974 | Tulk | 269/75 |
| 3,858,966 | A | * | 1/1975 | Lowell, Jr. | 359/881 |
| 4,621,821 | A | * | 11/1986 | Schneider | 279/83 |
| 6,116,845 | A | | 9/2000 | Wright | |
| 6,132,051 | A | * | 10/2000 | Morell et al. | 359/844 |
| 6,386,786 | B1 | * | 5/2002 | Perlman et al. | 403/90 |
| 6,409,131 | B1 | * | 6/2002 | Bentley et al. | 248/219.4 |
| 6,547,197 | B2 | * | 4/2003 | Kempf et al. | 248/218.4 |
| 6,722,842 | B1 | | 4/2004 | Sawdon | |
| 6,739,787 | B1 | | 5/2004 | Bystrom | |
| 7,178,421 | B2 | * | 2/2007 | Filipiak et al. | 74/490.05 |
| 7,353,985 | B1 | * | 4/2008 | Weatherholt, II | 232/39 |

* cited by examiner

*Primary Examiner*—Amy J Sterling
(74) *Attorney, Agent, or Firm*—Young, Basile, Hanlon & MacFarlane, P.C.

(57) ABSTRACT

An adjustable clamp apparatus for use in automated handling equipment includes a ball mount portion that provides rotational adjustment and a clamp portion for securing a support arm in a plurality of different positions. The clamp portion comprises an opening having a rectilinear cross-section.

10 Claims, 2 Drawing Sheets

ADAPTER ASSEMBLY INCLUDING TELESCOPING LINKS

RELATED APPLICATIONS

This application claims priority to U.S. Provisional Application 60/664,344 filed on Mar. 23, 2005.

BACKGROUND OF THE INVENTION

The present invention relates generally to automated handling equipment and, more particularly, to an adjustable adapter for handling objects during movement.

Automated handling equipment, such as a robotic arm or a transfer press assembly, is often employed in an industrial setting to move objects between stations. For example, a metal component is stamped in a first stamping press and then transferred to a second stamping press for a second stamping operation. To achieve high cycle times, the automated handling equipment must move the object quickly and accurately. Typically, the automated handling equipment includes an adapter or an actuated gripper that supports the object during movement.

A conventional adapter assembly includes a shovel or gripper that engages and supports the object during movement. Typically, the shovel or gripper is mounted on a robotic arm that moves the object between the stations. In prior adapter assemblies, the robotic arm includes a swivel clamp that allows rotational adjustment of the robotic arm. However, the length of the robotic arm is fixed such that the shovel or gripper is limited to different rotational positions. For example, the robotic arm cannot be extended or retracted to a desired position for supporting the object.

Hence, there is a need in the art for an adapter assembly that is rotationally adjustable and is capable of telescoping toward and away from an object.

SUMMARY OF THE INVENTION

One example adjustable clamp apparatus for use in automated handling equipment includes a ball mount portion that provides rotational adjustment and a clamp portion for securing a support arm in a plurality of different positions. The clamp portion comprises an opening having a rectilinear cross-section.

One example adjustable clamp assembly for use in automated handling equipment includes a work piece handling tool and one or more support arms for moving the work piece handling tool. One or more clamps adjustably support the support arms. The clamps include a ball mount portion for rotational adjustment of the support arm and an adjustable clamp portion for extending or retracting the support arm. The clamp portion includes an opening having a rectilinear cross-section for receiving the support arm.

One example method of adjusting an adjustable clamp assembly for use in automated handling equipment includes sliding a first support arm within a rectilinear cross-section opening of a first clamp portion to extend or retract a work piece handling tool.

The various features and advantages of this invention will become apparent to those skilled in the art from the following detailed description of a currently preferred embodiment. Drawings that accompany the detailed description can be briefly described as follows.

DETAILED DESCRIPTION OF THE PREFERRED EMBODIMENT

Figure 1:
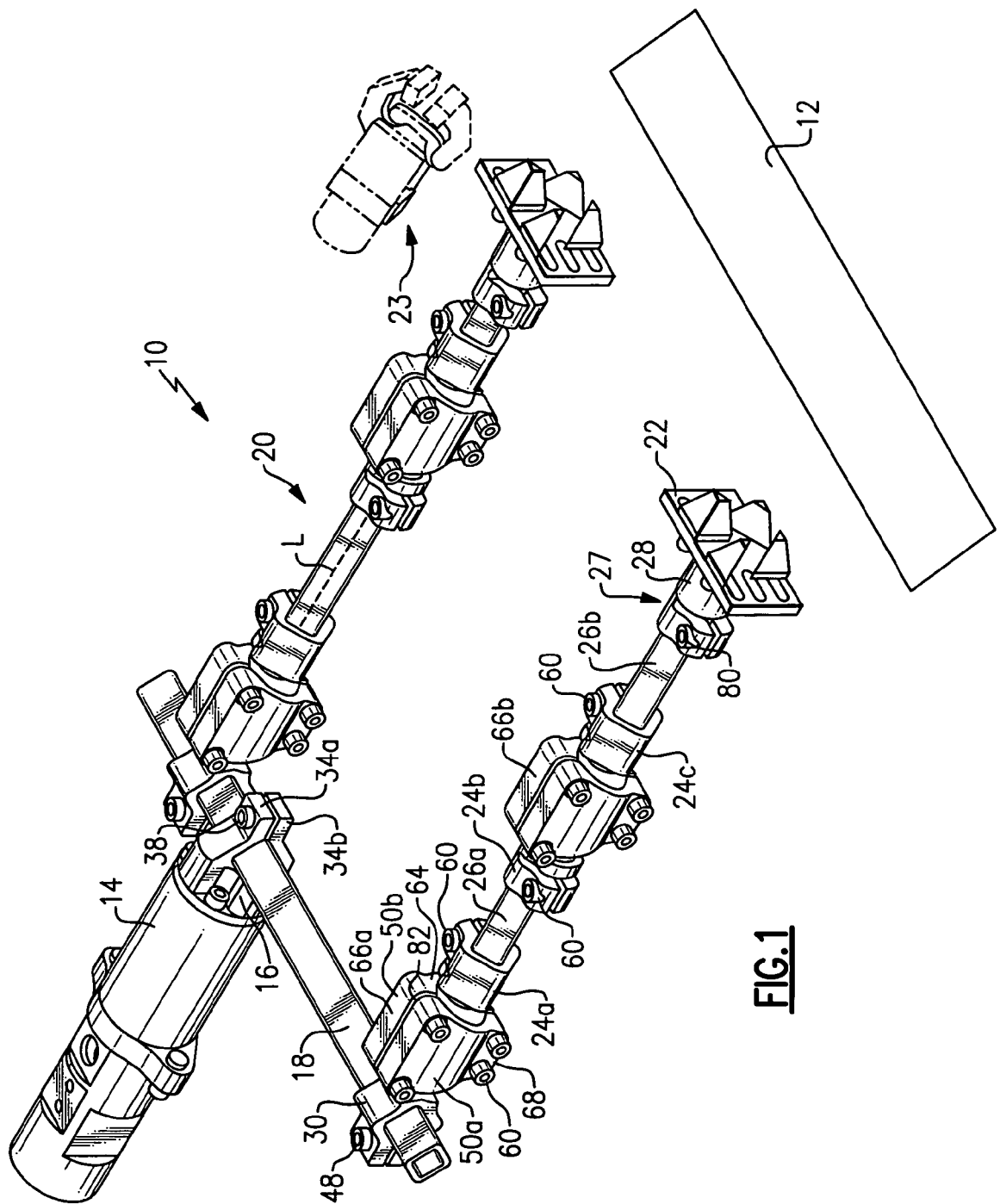
FIG. 1 illustrates a perspective view of an adapter assembly of the present invention.

FIG. 1 illustrates an adapter assembly 10 for securely supporting an object 12 (shown schematically), such as a multi-dimensional metal work piece, during movement of the object 12. The adapter assembly 10 can be, for example, a robotic adapter or a transfer press assembly for moving the object 12 between various industrial presses or other machines.

In the illustrated example, the adapter assembly 10 includes an adapter mount 16 that is attached to an adapter 14 and a support arm 18 attached to the adapter mount 16. In this example, the support arm 18 has a substantially square cross-section. Although only one adapter 14 and adapter mount 16 are illustrated, it is to be understood that any number of adapters 14 and adapter mounts 16 can be employed.

The adapter assembly 10 also includes a series of ball jointed links 20. A sliding clamp 30 attaches the series of ball jointed links 20 to the support arm 18. The ball jointed links 20 are positioned and secured in a desired position for the specific application. In this example, a shovel 22 is attached to an end of the series of ball jointed links 20 by an adapter clamp 27 having a mount portion 28. Alternatively, other work piece handling tools, such as a fluid-actuated gripper 23 (shown in phantom), are attached to the end of the series of ball jointed links 20 instead of the shovel 22. Two sets of series of ball jointed links 20 are shown in FIG. 1, although any number can be employed.

Figure 2:
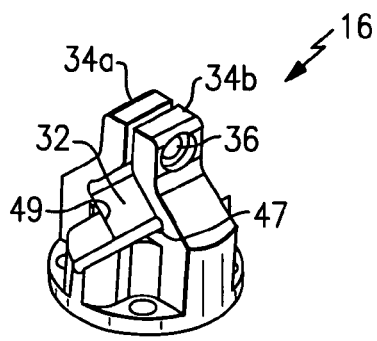
FIG. 2 illustrates a perspective view of an adapter mount of the adapter assembly.

FIG. 2 illustrates a perspective view of the adapter mount 16. The adapter mount 16 includes a substantially square shape opening 32 that matches the shape of the support arm 18. In this example, the substantially square opening 32 includes rounded corners 47 and linear sides 49. The corresponding rectilinear shape of the opening 32 and the support arm 18 prevent the support arm 18 from rotating about its own longitudinal axis. The term "rectilinear" as used in this description refers to a shape having at least one substantially straight side.

The adapter mount 16 includes a first half 34a and a second half 34b that each include an opening 36. A fastener 38 (shown in FIG. 1) is received in the openings 36 to secure the first half 34a and the second half 34b together and retain the support arm 18 in a stationary position relative to the adapter mount 16. If the fastener 38 is loosened, the support arm 18 can move relative to the adapter mount 16. If the fastener 38 is tightened, the first half 34a and the second half 34b of the adapter mount 16 tighten around the support arm 18, and the support arm 18 cannot move relative to the adapter mount 16.

Figure 3:
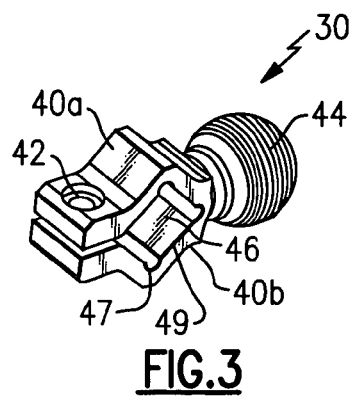
FIG. 3 illustrates a perspective view of a sliding clamp of the adapter assembly.

FIG. 3 illustrates a perspective view of the sliding clamp 30 that attaches the series of ball jointed links 20 to the support arm 18. The sliding clamp 30 includes a substantially square opening 46 that matches the shape of the support arm 18. In this example, the opening 46 includes rounded corners 47 and linear sides 49. The corresponding rectilinear shape of the opening 46 and the support arm 18 prevent the support arm 18 from rotating about its own longitudinal axis.

In this example, the sliding clamp 30 includes a first half 40a and a second half 40b that each include an opening 42. A fastener 48 (shown in FIG. 1) is received in the openings 42 to secure the first half 40a and the second half 40b together and retain the sliding clamp 30 in a stationary position relative to the support arm 18. If the fastener 48 is loosened, the sliding clamp 30 can move relative to the support arm 18. If the fastener 48 is tightened, the first half 40a and the second half 40b tighten around the support arm 18, and the sliding clamp 30 cannot move relative to the support arm 18. The sliding clamp 30 also includes a ball mount 44. In the illustrated example, the ball mount 44 is serrated.

In this example, the two halves 40a and 40b and the ball mount 44 form a single, unitary piece, such as from a casting process. The unitary piece provides a relatively high degree of strength between the halves 40a and 40b and the ball mount 44. Additionally, the unitary piece is less complex compared to previous clamps having multiple separate pieces.

Figure 4:
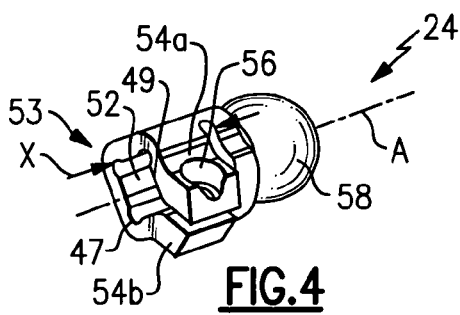
FIGS. 4 and 5 illustrate perspective views of an adjustable clamp of the adapter assembly.
Figure 5:
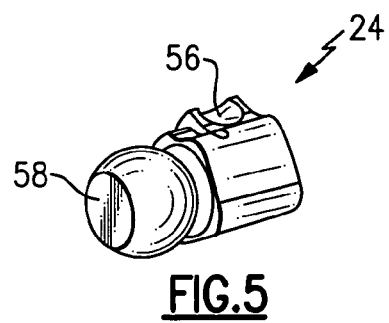

The series of ball jointed links 20 also includes an adjustable clamp 24, as shown in FIGS. 4 and 5. In this example, the adjustable clamp 24 includes a substantially square opening 52 that matches the shape of a support arm 26 that has a substantially square cross-section. The opening 52 defines an axis A. In this example, the opening 52 includes rounded corners 47 and linear sides 49. The corresponding rectilinear shape of the opening 52 and the support arm 26 prevent the support arm 26 from rotating about its own longitudinal axis L.

In the illustrated example, the adjustable clamp 24 includes a clamp portion 53 having a first half 54a and a second half 54b that each include an opening 56. A fastener 60 (shown in FIG. 1) is received in the openings 56 to secure the first half 54a and the second half 54b together and retain the support arm 26 in a stationary position relative to the adjustable clamp 24. If the fastener 60 is loosened, the support arm 26 can move relative to the adjustable clamp 24. If the fastener 60 is tightened, the halves 54a and 54b tighten around the support arm 26, and the support arm 26 cannot move relative to the adjustable clamp 24.

The adjustable clamp 24 also includes a ball mount 58, which allows rotational adjustment of the support arm 26. In this example, the ball mount 58 extends from the clamp portion 53 in a direction that is about parallel to the axis A of the opening 52. In one example, the ball mount 58 is serrated, similar to the example illustrated in FIG. 3. Alternatively, the ball mount extends in a different non-perpendicular direction relative to the axis A. Such a configuration provides a desirably wide range of rotational motion because the support arm 26 can rotate over a wide range without interfering with the socket clamp 66 (FIG. 1) to impede rotational movement, which is a problem with some prior clamps.

In the illustrated example, the adapter assembly 10 includes three adjustable clamps 24a, 24b and 24c, as shown in FIG. 1. However, it is possible that the adapter assembly 10 can only include one or two adjustable clamps 24 or more than three adjustable clamps 24.

Figure 6:
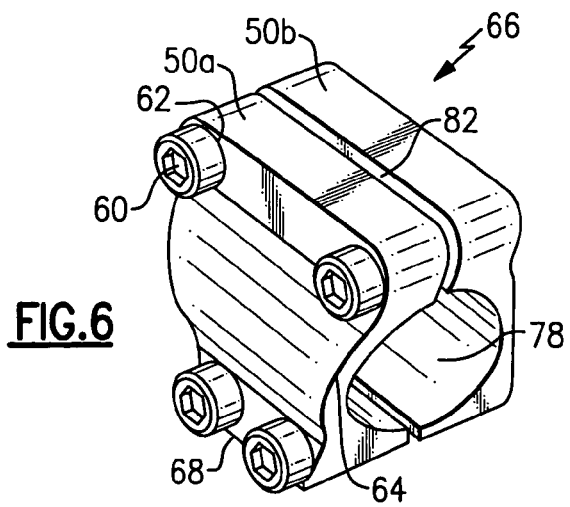
FIG. 6 illustrates a perspective view of a socket clamp of the adapter assembly.

As shown in FIG. 6, the adapter assembly 10 also includes a socket clamp 66. In this example, the socket clamp 66 includes two clamp halves 50a and 50b which are secured together by fasteners 60 received in apertures 62. Four fasteners 60 are employed in the illustrated example, although any number of fasteners can be employed. The clamp halves 50a and 50b define two sockets 78 (only one shown) that each receive either the ball mount 44 of the sliding clamp 30 or the ball mount 58 of the adjustable clamp 24. A plane defined by side surfaces 64 of the socket clamp 66 that define the sockets 78 are slightly inclined upwardly with respect to a plane defined by a lower surface 68 of the socket clamp 66. When assembled, a small gap 82 is formed between the clamp halves 50a and 50b. When the fasteners 60 are loosened, the ball mounts 44 and 58 can move within the sockets 78. When the fasteners 60 are tightened, the ball mounts 44 and 58 cannot move within the sockets 78.

As illustrated in the example shown in FIG. 1, two socket clamps 66a and 66b are employed in the series of ball jointed links 20. One socket clamp 66a receives the ball mount 44 of the sliding clamp 30 and the ball mount 58 of the adjustable clamp 24a, and the other socket clamp 66b receives the ball mount 58 of the adjustable clamp 24b and the ball mount 58 of the adjustable clamp 24c.

When the fasteners 60 of the socket clamp 66a are loosened, the ball mounts 44 and 58 can rotate within the sockets 78, allowing the sliding clamp 30 and the adjustable clamp 24a to move with respect to the socket clamp 66a. When the fasteners 60 of the socket clamp 66a are tightened, the sliding clamp 30 and the adjustable clamp 24a are secured relative to the socket clamp 66a and cannot move. When the fasteners 60 secured relative to the socket clamp 66a are loosened, the ball mounts 58 of the adjustable clamps 24b and 24c can rotate within the sockets 78, allowing the adjustable clamps 24b and 24c to move with respect to the socket clamp 66b. When the fasteners 60 of the socket clamp 66b are tightened, the adjustable clamps 24b and 24c are secured relative to the socket clamp 66b and cannot move.

Figure 7:
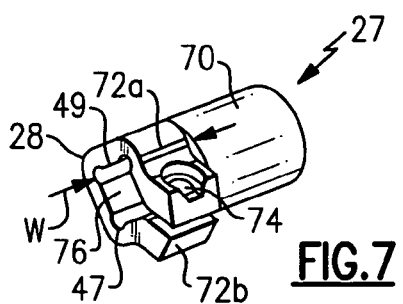
FIGS. 7 and 8 illustrate perspective views of a mount portion of the adapter assembly.
Figure 8:
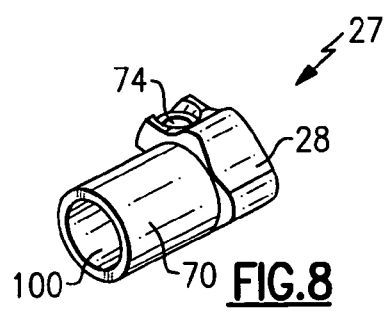

FIGS. 7 and 8 illustrate a perspective view of the adapter clamp 27 that mounts the shovel 22 or gripper 23. The mount portion 28 of the adapter clamp 27 includes a substantially square opening 76 that matches the shape of the support arm 26. In this example, the opening 76 includes rounded corners 47 and linear sides 49. The corresponding rectilinear shape of the opening 76 and the support arm 26 prevents the support arm 26 from rotating about its own longitudinal axis.

In this example, the mount portion 28 includes a first half 72a and a second half 72b that each include an opening 74. A fastener 80 (shown in FIG. 1) is received in the openings 74 to secure the first half 72a and the second half 72b together and retain the support arm 26 in a stationary position relative to the mount portion 28. If the fastener 80 is loosened, the support arm 26 can move relative to the mount portion 28. If the fastener 80 is tightened, the support arm 26 cannot move relative to the mount portion 28. The mount portion 28 includes a mount 70 having an opening 100 that is adapted to support the shovel 22 or gripper 23 in a known manner.

In the example of FIG. 1, the support arm 26 includes a first support arm 26a received in the opening 52 of the adjustable clamps 24a and 24b and a second support arm 26b received in the opening 52 of the adjustable clamp 24c and the opening 76 of the mount portion 28. The support arms 26a and 26b allow the series of ball jointed links 20 to telescopically extend or retract to achieve a desirable shovel 22 or gripper 23 position.

When the fastener 60 of the adjustable clamp 24a is loosened, the support arm 26a can slide within the opening 52 of the adjustable clamp 24a, and when the fastener 60 of the adjustable clamp 24b is loosened, the support arm 26a can slide within the opening 52 of the adjustable clamp 24b. When the fastener 60 of the adjustable clamp 24c is loosened, the support arm 26b can slide within the opening 52 of the adjustable clamp 24c, and when the fastener 80 of the mount portion 28 of the adapter clamp 27 is loosened, the support arm 26b can slide within the opening 76 of the mount portion 28.

In this example, each clamp portion 53 of the adjustable clamps 24 and the mount portion of the adapter clamp 27 has an associated clamp width X and W, respectively (FIGS. 4 and 7). The clamp widths of the individual clamps need not be equal to each other, depending on the desired amount of extension and retraction. The end portion of the support arm 26 slides along the width X of the opening 52 and along the width W of the opening 76 to control the amount of extension or retraction. Thus, the widths W and X correspond to the amount of available extension or retraction.

In one example, the series of ball jointed links 20 can adjust over a range of approximately ¼ of an inch at each of the adjustable clamps 24a, 24b and 24c and the mount portion 28 by movement of the support arm 26a and 26b. Therefore, approximately one inch of extension is possible in this example. This allows the series of ball jointed links 20 to telescopically extend or retract by approximately one inch towards the shovel 22 or gripper 23. This allows for more accurate positioning of the shovel 22 or gripper 23 relative to the object 12. Given this description, one of ordinary skill in the art will recognize suitable clamp widths W and X to meet their particular extension and retraction needs.

When the support arm 26a and 26b are in the desired position, the fasteners 60 of the adjustable clamps 24a, 24b, 24c and the fastener 80 of the mount portion 28 are tightened, and the support arm 26a and 26b cannot slide relative to the adjustable clamps 24a, 24b, and 24c and the mount portion 28, securing the series of ball jointed links 20 in a desired position.

The foregoing description is exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention.

What is claimed is:

1. An adjustable clamp apparatus for use in automated handling equipment, the adjustable clamp apparatus comprising:
    a ball mount portion; and
    a clamp portion for securing a member in a plurality of different positions, the clamp portion comprising an opening having a rectilinear cross-section including substantially linear sides that meet at inside corners that are recessed from the substantially linear sides wherein the clamp portion includes a first section and a second section that each include a fastener opening and one of the inside corners forms an opening that extends between the first section and the second section in a direction perpendicular to an axis formed by the fastener openings.

2. The apparatus as recited in claim 1, wherein the rectilinear cross-section is rectangular.

3. The apparatus as recited in claim 1, wherein the member connects to a work piece handling tool.

4. The apparatus as recited in claim 1, wherein the ball mount portion and the clamp portion comprise a single, distinct piece.

5. The apparatus as recited in claim 1, wherein the ball mount portion is serrated.

6. The apparatus as recited in claim 1, further comprising a fastener received in the fastener opening of the first section and in the fastener opening of the second section to secure the first section and the second section together.

7. The apparatus as recited in claim 1, wherein the ball mount portion extends along an axis that is perpendicular to an axis formed by the fastener openings.

8. The apparatus as recited in claim 1, wherein the member extends along an axis, and the rectilinear cross-sectional shape of the clamp portion opening prevents the member from rotating about the axis.

9. The apparatus as recited in claim 1, wherein the clamp portion includes four sides, wherein the first side and the second side form a first recessed inside corner, wherein the second side and the third side form a second recessed inside corner, wherein the third side and the fourth side form a third recessed inside corner, and wherein the opening is defined between the first side and the fourth side and extends away from the second recessed inside corner.

10. The apparatus as recited in claim 8, wherein the junction also extends away from the ball mount portion.

* * * * *